(12) United States Patent
Zhang et al.

(10) Patent No.: US 11,778,528 B2
(45) Date of Patent: Oct. 3, 2023

(54) LAYER 1 BASED UPLINK-ONLY CELL SWITCH

(71) Applicant: QUALCOMM Incorporated, San Diego, CA (US)

(72) Inventors: Qian Zhang, Basking Ridge, NJ (US); Junyi Li, Franklin Park, NJ (US); Yan Zhou, San Diego, CA (US); Tianyang Bai, Somerville, NJ (US); Kiran Venugopal, Raritan, NJ (US); Ling Ding, Chester, NJ (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/195,325

(22) Filed: Mar. 8, 2021

(65) Prior Publication Data
US 2021/0289408 A1    Sep. 16, 2021

Related U.S. Application Data

(60) Provisional application No. 62/989,436, filed on Mar. 13, 2020.

(51) Int. Cl.
*H04W 4/00* (2018.01)
*H04W 36/00* (2009.01)
(Continued)

(52) U.S. Cl.
CPC . *H04W 36/00837* (2018.08); *H04W 36/0077* (2013.01); *H04W 36/08* (2013.01); *H04W 36/32* (2013.01); *H04W 76/11* (2018.02)

(58) Field of Classification Search
CPC ....... H04W 36/00837; H04W 36/0077; H04W 36/08; H04W 36/32; H04W 76/11; H04W 88/02; H04W 88/08; H04W 36/36
(Continued)

(56) References Cited

U.S. PATENT DOCUMENTS

| 6,681,112 B1 | 1/2004 | Schwarz et al. |
| 7,991,398 B2 * | 8/2011 | Rune ........ H04L 45/48 455/456.2 |

(Continued)

FOREIGN PATENT DOCUMENTS

| EP | 2670197 A1 * | 12/2013 | ........ H04W 36/24 |
| EP | 2670197 A1 | 12/2013 | |
| WO | 2019033027 A1 | 2/2019 | |

OTHER PUBLICATIONS

International Search Report and Written Opinion—PCT/US2021/021466—ISA/EPO—dated Jun. 28, 2021.

*Primary Examiner* — Amancio Gonzalez
(74) *Attorney, Agent, or Firm* — Arun Swain

(57) ABSTRACT

Various aspects of the present disclosure generally relate to wireless communication. In some aspects, a user equipment may transmit, to a base station, a request for a cell switch based at least in part on a trigger condition associated with an uplink-only cell switch being satisfied; and perform the uplink-only cell switch based at least in part on a physical-layer or medium-access-control layer inter-cell mobility operation with the base station based at least in part on transmitting the request. Numerous other aspects are provided.

30 Claims, 7 Drawing Sheets

(51) Int. Cl.
*H04W 36/32* (2009.01)
*H04W 76/11* (2018.01)
*H04W 36/08* (2009.01)

(58) Field of Classification Search
USPC .......................................................... 370/331
See application file for complete search history.

(56) References Cited

U.S. PATENT DOCUMENTS

| | | | |
|---|---|---|---|
| 8,626,171 B2* | 1/2014 | Yokota | H04W 36/0072 |
| | | | 455/442 |
| 8,908,635 B2* | 12/2014 | Boncz | H04W 52/40 |
| | | | 455/522 |
| 9,699,701 B2 | 7/2017 | Chen et al. | |
| 10,536,946 B2* | 1/2020 | Zhu | H04W 28/0247 |
| 10,623,149 B2* | 4/2020 | Jheng | H04L 1/1861 |
| 10,743,225 B2* | 8/2020 | Kong | H04W 36/02 |
| 10,749,639 B2* | 8/2020 | Jheng | H04L 1/1861 |
| 11,109,289 B2* | 8/2021 | Kong | H04W 36/04 |
| 11,252,717 B2* | 2/2022 | Islam | H04L 27/26025 |
| 2007/0197222 A1* | 8/2007 | Rune | H04L 45/48 |
| | | | 455/436 |
| 2009/0131059 A1* | 5/2009 | Liu | H04W 36/18 |
| | | | 455/442 |
| 2018/0184415 A1* | 6/2018 | Rong | H04W 48/18 |

* cited by examiner

LAYER 1 BASED UPLINK-ONLY CELL SWITCH

CROSS-REFERENCE TO RELATED APPLICATION

This patent application claims priority to U.S. Provisional Patent Application No. 62/989,436, filed on Mar. 13, 2020, entitled "LAYER 1 BASED UPLINK-ONLY CELL SWITCH," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for an uplink-only cell switch.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may be associated with an uplink on which the UE transmits data, control signaling, reference signaling, and the like to a base station, and a downlink on which the UE receives data from the base station. For example, the uplink and the downlink may be provided using the same beam or respective beams, or may be associated with respective cells. Some circumstances may lead to failure or inadequacy of one of the uplink or the downlink and not the other of the uplink or the downlink.

SUMMARY

In some aspects, a method of wireless communication, performed by a user equipment (UE), may include determining that a trigger condition associated with an uplink-only cell switch is satisfied. The method may include transmitting, to a base station, a request for a cell switch. The method may include performing the uplink-only cell switch based at least in part on a physical-layer or medium-access-control layer inter-cell mobility operation with the base station based at least in part on transmitting the request.

In some aspects, a method of wireless communication, performed by a base station, may include receiving, from a UE, a request for a cell switch based at least in part on a determination by the UE that a trigger condition associated with an uplink-only cell switch is satisfied. The method may include transmitting, to the UE, information configuring the uplink-only cell switch. The method may include performing the uplink-only cell switch with the user equipment in accordance with the information configuring the uplink-only cell switch based at least in part on a physical-layer or medium-access-control layer inter-cell mobility operation.

In some aspects, a UE for wireless communication may include a memory and one or more processors operatively coupled to the memory. The memory and the one or more processors may be configured to determine that a trigger condition associated with an uplink-only cell switch is satisfied. The memory and the one or more processors may be configured to transmit, to a base station, a request for a cell switch. The memory and the one or more processors may be configured to perform the uplink-only cell switch based at least in part on a physical-layer or medium-access-control layer inter-cell mobility operation with the base station based at least in part on transmitting the request.

In some aspects, a base station for wireless communication may include a memory and one or more processors operatively coupled to the memory. The memory and the one or more processors may be configured to receive, from a UE, a request for a cell switch based at least in part on a determination by the UE that a trigger condition associated with an uplink-only cell switch is satisfied. The memory and the one or more processors may be configured to transmit, to the UE, information configuring the uplink-only cell switch. The memory and the one or more processors may be configured to perform the uplink-only cell switch with the user equipment in accordance with the information configuring the uplink-only cell switch based at least in part on a physical-layer or medium-access-control layer inter-cell mobility operation.

In some aspects, a non-transitory computer-readable medium may store one or more instructions for wireless communication. The one or more instructions, when executed by one or more processors of a UE, may cause the one or more processors to determine that a trigger condition associated with an uplink-only cell switch is satisfied. The one or more instructions, when executed by one or more processors of the UE, may cause the one or more processors to transmit, to a base station, a request for a cell switch. The one or more instructions, when executed by one or more processors of the UE, may cause the one or more processors to perform the uplink-only cell switch based at least in part on a physical-layer or medium-access-control layer inter-cell mobility operation with the base station based at least in part on transmitting the request.

In some aspects, a non-transitory computer-readable medium may store one or more instructions for wireless communication. The one or more instructions, when executed by one or more processors of a base station, may cause the one or more processors to receive, from a UE, a request for a cell switch based at least in part on a determination by the UE that a trigger condition associated with an uplink-only cell switch is satisfied. The one or more instructions, when executed by one or more processors of the base station, may cause the one or more processors to transmit, to the UE, information configuring the uplink-only cell switch. The one or more instructions, when executed by one or more processors of the base station, may cause the one or more processors to perform the uplink-only cell switch with the user equipment in accordance with the information configuring the uplink-only cell switch based at least in part on a physical-layer or medium-access-control layer inter-cell mobility operation.

In some aspects, an apparatus for wireless communication may include means for determining that a trigger condition associated with an uplink-only cell switch is satisfied. The apparatus may include means for transmitting, to a base station, a request for a cell switch. The apparatus may include means for performing the uplink-only cell switch based at least in part on a physical-layer or medium-access-control layer inter-cell mobility operation with the base station based at least in part on transmitting the request.

In some aspects, an apparatus for wireless communication may include means for receiving, from a UE, a request for a cell switch based at least in part on a determination by the UE that a trigger condition associated with an uplink-only cell switch is satisfied. The apparatus may include means for transmitting, to the UE, information configuring the uplink-only cell switch. The apparatus may include means for performing the uplink-only cell switch with the user equipment in accordance with the information configuring the uplink-only cell switch based at least in part on a physical-layer or medium-access-control layer inter-cell mobility operation.

In some aspects, a method of wireless communication, performed by a user equipment (UE), may include transmitting, to a base station, a request for a cell switch based at least in part on a trigger condition associated with an uplink-only cell switch being satisfied. The method may include performing the uplink-only cell switch based at least in part on a physical-layer or medium-access-control layer inter-cell mobility operation with the base station based at least in part on transmitting the request.

In some aspects, a method of wireless communication, performed by a base station, may include receiving, from a UE, a request for a cell switch based at least in part on a determination by the UE that a trigger condition associated with an uplink-only cell switch is satisfied. The method may include transmitting, to the UE, information configuring the uplink-only cell switch. The method may include performing the uplink-only cell switch with the user equipment in accordance with the information configuring the uplink-only cell switch based at least in part on a physical-layer or medium-access-control layer inter-cell mobility operation.

In some aspects, a UE for wireless communication may include a memory and one or more processors operatively coupled to the memory. The memory and the one or more processors may be configured to transmit, to a base station, a request for a cell switch based at least in part on a trigger condition associated with an uplink-only cell switch being satisfied. The memory and the one or more processors may be configured to perform the uplink-only cell switch based at least in part on a physical-layer or medium-access-control layer inter-cell mobility operation with the base station based at least in part on transmitting the request.

In some aspects, a base station for wireless communication may include a memory and one or more processors operatively coupled to the memory. The memory and the one or more processors may be configured to receive, from a UE, a request for a cell switch based at least in part on a determination by the UE that a trigger condition associated with an uplink-only cell switch is satisfied. The memory and the one or more processors may be configured to transmit, to the UE, information configuring the uplink-only cell switch. The memory and the one or more processors may be configured to perform the uplink-only cell switch with the user equipment in accordance with the information configuring the uplink-only cell switch based at least in part on a physical-layer or medium-access-control layer inter-cell mobility operation.

In some aspects, a non-transitory computer-readable medium may store one or more instructions for wireless communication. The one or more instructions, when executed by one or more processors of a UE, may cause the one or more processors to transmit, to a base station, a request for a cell switch based at least in part on a trigger condition associated with an uplink-only cell switch being satisfied. The one or more instructions, when executed by one or more processors of the UE, may cause the one or more processors to perform the uplink-only cell switch based at least in part on a physical-layer or medium-access-control layer inter-cell mobility operation with the base station based at least in part on transmitting the request.

In some aspects, a non-transitory computer-readable medium may store one or more instructions for wireless communication. The one or more instructions, when executed by one or more processors of a base station, may cause the one or more processors to receive, from a UE, a request for a cell switch based at least in part on a determination by the UE that a trigger condition associated with an uplink-only cell switch is satisfied. The one or more instructions, when executed by one or more processors of the base station, may cause the one or more processors to transmit, to the UE, information configuring the uplink-only cell switch. The one or more instructions, when executed by one or more processors of the base station, may cause the one or more processors to perform the uplink-only cell switch with the user equipment in accordance with the information configuring the uplink-only cell switch based at least in part on a physical-layer or medium-access-control layer inter-cell mobility operation.

In some aspects, an apparatus for wireless communication may include means for transmitting, to a base station, a request for a cell switch based at least in part on a trigger condition associated with an uplink-only cell switch being satisfied. The apparatus may include means for performing the uplink-only cell switch based at least in part on a physical-layer or medium-access-control layer inter-cell mobility operation with the base station based at least in part on transmitting the request.

In some aspects, an apparatus for wireless communication may include means for receiving, from a UE, a request for a cell switch based at least in part on a determination by the UE that a trigger condition associated with an uplink-only cell switch is satisfied. The apparatus may include means for transmitting, to the UE, information configuring the uplink-only cell switch. The apparatus may include means for performing the uplink-only cell switch with the user equipment in accordance with the information configuring the uplink-only cell switch based at least in part on a physical-layer or medium-access-control layer inter-cell mobility operation.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
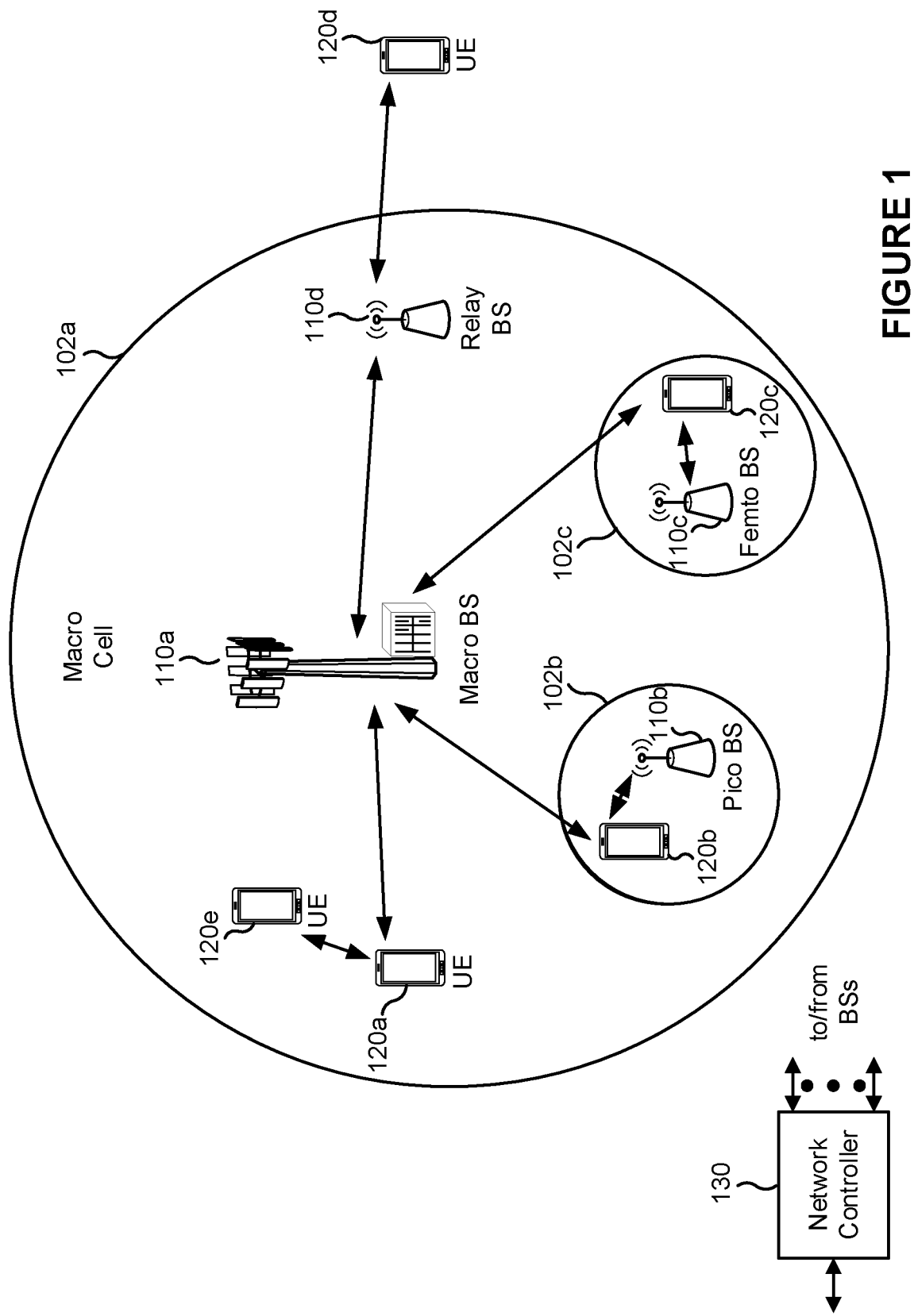
FIG. 1 is a diagram illustrating an example wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

A UE may perform a mobility operation to switch from one cell to another cell. Such a mobility operation may be referred to as an inter-cell mobility operation or a cell switch. An inter-cell mobility operation may be associated with some degree of latency and delay, due to the exchange of messages, propagation delay, delay associated with identifying a target cell for the inter-cell mobility operation, and so on. One way to reduce latency and delay associated with an inter-cell mobility operation is to perform a physical layer (Layer 1) or medium access control (MAC) layer (Layer 2) (L1/L2) inter-cell mobility operation. In an L1/L2 inter-cell mobility operation, signaling associated with the inter-cell mobility operation may be performed using physical layer signaling (such as downlink or uplink control information) or MAC-layer signaling (MAC control elements (MAC-CEs)), which may reduce latency and delay relative to performing such signaling using radio resource control signaling (that is, Layer 3 signaling).

A UE may be associated with an uplink on which the UE transmits data to a base station, and a downlink on which the UE receives data from the base station. For example, the uplink and the downlink may be provided using the same beam or respective beams, or may be associated with respective cells. Some circumstances may lead to failure or inadequacy of one of the uplink or the downlink and not the other of the uplink or the downlink. One such circumstance may be caused by a maximum permissible exposure (MPE) condition, which is a limitation on how much power a UE can transmit in certain directions, such as toward a user of the UE. The imposition of an MPE condition may mean that an uplink of the UE would benefit from an inter-cell mobility operation, while a downlink of the UE would not benefit from the inter-cell mobility operation. For example, performing an inter-cell mobility operation for both the uplink and the downlink may use significant communication and computing resources. The usage of communication and computing resources may be exacerbated in situations when the UE performs frequent inter-cell mobility operations, such as when the UE performs L1/L2 inter-cell mobility operations to handle high-mobility operation.

Various aspects relate generally to an uplink-only inter-cell mobility operation. Some aspects more specifically relate to UE-side determination that an uplink-only inter-cell mobility operation is to be performed based at least in part on an MPE condition being satisfied or based at least in part on a different trigger condition. The UE may provide a request for a cell switch to a base station based at least in part on determining that the uplink-only inter-cell mobility operation is to be performed. The base station may determine that the cell switch is an uplink-only cell switch (such as based at least in part on the request or other information). In some aspects, the base station may select a particular remote radio head (RRH), physical cell identifier (PCI), or synchronization signal block (SSB) to serve the uplink, for example, based at least in part on a reported measurement value associated with the particular RRH, PCI, or SSB. The UE and the base station may perform the uplink-only cell switch. For example, the UE and the base station may perform an L1/L2 inter-cell mobility operation for an uplink connection and not for a downlink connection between the UE and the base station. After the uplink-only cell switch, the UE may use a first receive beam to receive a downlink communication (such as a shared channel or a control channel) and may use a second transmit beam (different than the first receive beam) to transmit an uplink communication (such as a shared channel or a control channel). For example, the first receive beam and the second transmit beam may be trained separately from each other. Furthermore, the downlink communication and the uplink communication may be scrambled by different cell identifiers, such as a cell identifier corresponding to a cell associated with the first receive beam and a cell associated with the second transmit beam, respectively.

Particular aspects of the subject matter described in this disclosure can be implemented to realize one or more of the following potential advantages. In some examples, the described techniques can be used to conserve computing and communication resources that would otherwise be used to perform cell switches on both of the uplink and the downlink to address a trigger condition relating to only one of the uplink or the downlink. Furthermore, conformance with MPE restrictions may be improved while mitigating an impact on downlink throughput of the UE and the base station. Still further, by scrambling communications on the beams differently, inter-cell interference on the uplink and the downlink is avoided. Even further, by performing separate beam training for the uplink and the downlink, maintenance of separate beams is enabled, which allows the UE to use a downlink beam that provides acceptable (such as optimal) downlink performance while using an uplink beam that satisfies MPE limitations in the case where an uplink beam that is co-located with the downlink beam would violate MPE limitations.

FIG. 1 is a diagram illustrating an example wireless network in accordance with the present disclosure. The wireless network may be or may include elements of a 5G (NR) network or a Long Term Evolution (LTE) network, among other examples. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, an NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, channels, or the like. For example, devices of the wireless network may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (less than 24.25 GHz). It is contemplated that the frequencies included in FR1 and FR2 may be modified, and techniques described herein are applicable to those modified frequency ranges.

Figure 2:
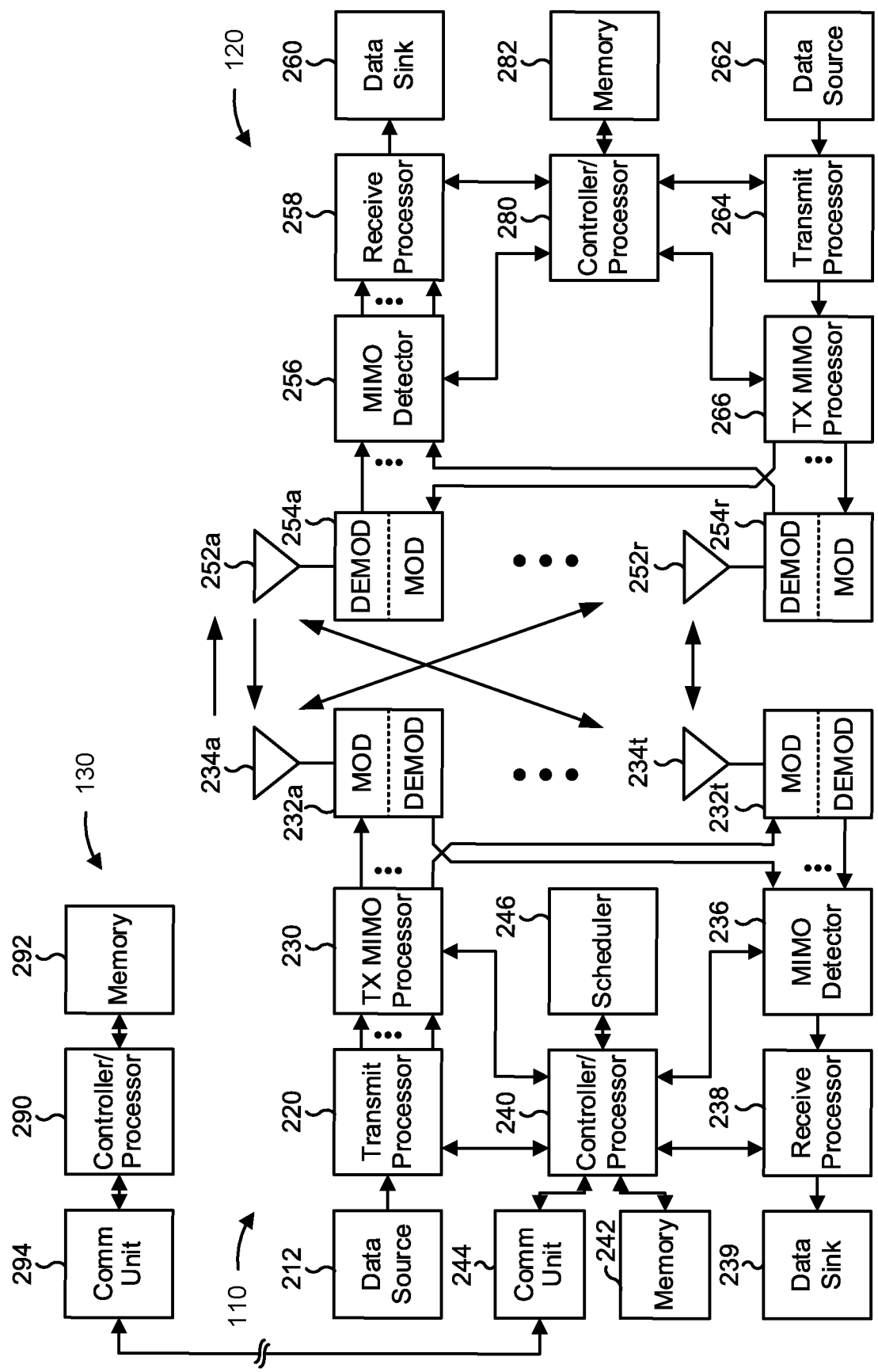
FIG. 2 is a diagram illustrating an example base station (BS) in communication with a user equipment (UE) in a wireless network in accordance with the present disclosure.

FIG. 2 is a block diagram illustrating an example base station (BS) in communication with a user equipment (UE) in a wireless network in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, a modulator and a demodulator (MOD/DEMOD 254) of the UE 120 may be included in a modem of the UE 120. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (MOD/DEMOD 232) of the base station 110 may be included in a modem of the base station 110. Network controller 130 may include communication unit 294, controller/processor 290, and memory 292.

Controller/processor 240 of base station 110, controller/processor 280 of UE 120, or any other component(s) of FIG. 2 may perform one or more techniques associated with Layer 1 based uplink-only cell switching, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, or other processes as described herein. Memories 242 and 282 may store data and program codes for base station 110 and UE 120, respectively. A scheduler 246 may schedule UEs for data transmission on the downlink or uplink.

In some aspects, UE 120 may include means for determining that a trigger condition associated with an uplink-only cell switch is satisfied, means for transmitting, to a base station, a request for a cell switch, means for performing the uplink-only cell switch based at least in part on a physical-layer or medium-access-control layer inter-cell mobility operation with the base station based at least in part on transmitting the request, means for receiving the information configuring the uplink-only cell switch using at least one of: radio resource control signaling, a medium access control control element, or downlink control information, means for receiving downlink communications using a first beam, means for transmitting uplink communications using a second beam, means for performing a first training operation for the first beam and a second training operation, different than the first training operation, for the second beam, means for scrambling the uplink communications using a first physical cell identifier, means for descrambling the downlink communications using a second physical cell identifier that is different than the first physical cell identifier, among other examples, or combinations thereof. In some aspects, such means may include one or more components of UE 120 described in connection with FIG. 2.

In some aspects, base station 110 may include means for receiving, from a UE, a request for a cell switch based at least in part on a determination by the UE that a trigger condition associated with an uplink-only cell switch is satisfied, means for transmitting, to the UE, information configuring the uplink-only cell switch, means for transmitting, to a base station, a request for a cell switch based at least in part on a trigger condition associated with an uplink-only cell switch being satisfied, means for performing the uplink-only cell switch with the user equipment in accordance with the information configuring the uplink-only cell switch based at least in part on a physical-layer or medium-access-control layer inter-cell mobility operation, means for transmitting the information configuring the uplink-only cell switch using at least one of radio resource control signaling, a medium access control control element, or downlink control information, means for determining the information configuring the uplink-only cell switch based at least in part on a reference signal received power associated with a synchronization signal block corresponding to a physical cell identifier for a target uplink cell of the uplink-only cell switch, means for transmitting downlink communications using a first beam, means for receiving uplink communications using a second beam, means for performing a first training operation for the first beam and a second training operation, different than the first training operation, for the second beam, means for descrambling the uplink communications using a first physical cell identifier, means for scrambling the downlink communications using a second physical cell identifier that is different than the first physical cell identifier, among other examples, or combinations thereof. In some aspects, such means may include one or more components of base station 110 described in connection with FIG. 2.

A wireless communication device, such as UE 120, may be subject to certain limitations on transmit power of the wireless communication device. For example, a regulatory body may impose limits on exposure rate of a user of a UE, absorption rate of a user of the UE, or the like, so that the user is not subjected to untenable amounts of radiated power from the UE. One example of a limit is defined by a specific absorption rate (SAR). SAR is a measurement of the rate (such as amount per unit mass) at which radio frequency (RF) electromagnetic field energy is absorbed by the human body. The Federal Communications Commission (FCC) and other regulatory entities have placed limitations on SAR, with which UEs subject to these limitations must comply. Examples of such limitations include 1.6 milliwatts per gram (mW/g) of human tissue (as specified by the FCC) and 2.0 mW/g per 10-grams of human tissue for the European Union (EU) and many other countries who follow the International Commission for Non-Ionizing Radiation Protection (ICNIRP). Another example of a limit is defined by an MPE. MPE refers to the highest power or power density (PD) (expressed in watts per square centimeter or joules per square centimeter) allowed for the radiation source (that is, the UE) to be considered safe. Some SAR/MPE limitations may be metered on a time-averaged basis, meaning that an average transmit power (such power density or energy level) of communications of the UE in a time window must satisfy the SAR/MPE limitation. The techniques described herein can be applied for any of the above-described limits or for other limits not explicitly disclosed above.

Figure 3:
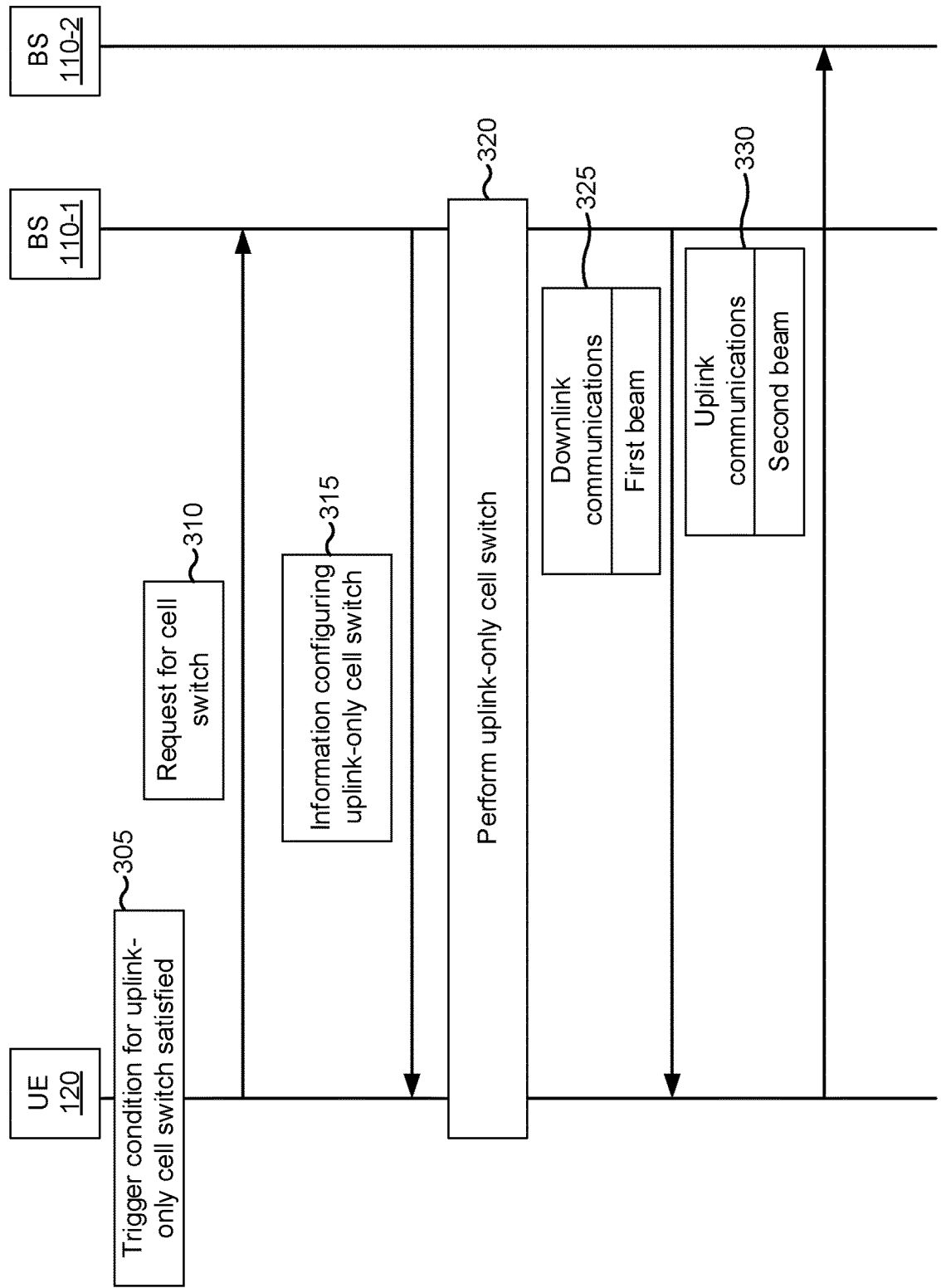
FIG. 3 is a diagram illustrating an example of signaling associated with an uplink-only cell switch in accordance with the present disclosure.

FIG. 3 is a diagram illustrating an example of signaling associated with an uplink-only cell switch in accordance with the present disclosure. As shown, FIG. 3 includes a UE 120, a BS 110-1, and a BS 110-2.

In a first operation 305, the UE 120 may determine that a trigger condition for an uplink-only cell switch is satisfied. For example, the UE 120 may determine that an MPE condition is satisfied with regard to an uplink transmission of the UE 120. The MPE condition may be based at least in part on a transmit power of a beam and a transmit direction of the beam. For example, a beam transmitted toward a user or in certain directions relative to the UE 120 may be subject to a transmit power threshold that, if exceeded, may satisfy a trigger condition for an uplink-only cell switch. In some aspects, the trigger condition may be different than an MPE condition, such as a load balancing condition. In some aspects, the trigger condition may be based at least in part on an antenna or antenna panel used to transmit the beam, a frequency range associated with the beam, or the like. In some aspects, the trigger condition may be based at least in part on a time window. For example, the trigger condition may be associated with a threshold transmit power or a threshold amount of radiated energy within a time window.

In a second operation, the UE 120 may transmit a request 310 for a cell switch. For example, the UE 120 may transmit the request via uplink control information (UCI). In some examples, the UCI may include a field indicating that the cell switch is to be an uplink-only cell switch. For example, the field may be a switch type field of the UCI. In some examples, such as if the request 310 is not associated with the trigger condition for the uplink-only cell switch, then the UE 120 may configure the field to indicate that the cell switch is a non-uplink-only cell switch (such as a baseline cell switch or an uplink-and-downlink cell switch). In some other examples, if the request 310 is not associated with the trigger condition for the uplink-only cell switch, then the request may not include the field. In such a case, the BS 110-1 may determine that the cell switch is to be an uplink-only cell switch, as described below, which simplifies implementation at the UE 120.

In some other examples, the BS 110-1 may determine that the cell switch is to be an uplink-only cell switch. For example, the BS 110-1 may determine that uplink performance of the UE 120 indicates that the uplink-only cell switch is to be performed, or may determine that the trigger condition is satisfied. In some aspects, the BS 110-1 may determine that uplink performance of the UE 120 indicates that the uplink-only cell switch is to be performed based at least in part on an uplink throughput, an uplink block error rate (BLER), a number of retransmissions on the uplink, an uplink transmission parameter (such as a modulation scheme, a code rate, or the like), a signal strength of an uplink transmission by the UE 120, or the like. The determination by the BS 110-1 of whether the cell switch is an uplink-only cell switch may be useful in a scenario when the UE 120 cannot readily determine that uplink performance is unsatisfactory or when the trigger condition is based at least in part on a condition at the BS 110-1. In some aspects, the BS 110-1 may determine that the cell switch is to be performed without having received the request 310. For example, the BS 110-1 may determine that uplink performance of the UE 120 indicates that the uplink-only cell switch is to be performed or that the trigger condition is satisfied without having received the request 310 from the UE 120, thereby conserving computing and communication resources of the UE 120 that would otherwise be used to transmit the request 310 and configure the UE 120 to transmit the request 310.

In a third operation, the BS 110-1 may transmit information 315 configuring the uplink-only cell switch. For example, the BS 110-1 may transmit the information 315 via L1/L2 signaling, such as downlink control information (DCI) signaling or MAC signaling. In some examples, the information 315 may indicate that the cell switch is an uplink-only cell switch. For example, a field of the information 315 (such as a switch type field) may indicate that the cell switch is an uplink-only cell switch, which conserves processing resources of the UE 120 associated with determining that the cell switch is an uplink-only cell switch. In other examples, the information 315 may not explicitly indicate that the cell switch is an uplink-only cell switch. For example, the information 315 may include information relating only to an uplink-only cell switch and not to a downlink cell switch. In such an example, the UE 120 may determine that the cell switch is an uplink-only cell switch based at least in part on the information 315 omitting information relating to a downlink cell switch, which reduces signaling overhead associated with an explicit indication that the cell switch is an uplink-only cell switch.

In some aspects, the information 315 may indicate a cell or configuration associated with a target cell for the uplink of the UE 120. For example, the BS 110-1 may indicate one or more remote radio heads (RRHs), one or more physical cell identifiers (PCIs), one or more synchronization signal/physical broadcast channel blocks (SSBs), or one or more beam identifiers that are to provide the uplink of the UE 120. The BS 110-1 may select the one or more RRHs, PCIs, SSBs, or beam identifiers based at least in part on measurements associated with the one or more RRHs, SSBs, PCIs, or beam identifiers, such as a reference signal received power (RSRP) per reported SSB identifier and per reported PCI. In some aspects, the BS 110-1 may select the one or more RRHs, PCIs, SSBs, or beam identifiers based at least in part on one or more parameters, such as a beam direction, a beam width, an RSRP per SSB identifier and per reported PCI, an antenna panel used to generate a corresponding beam, a combination thereof, or other parameters. For example, the BS 110-1 select the one or more RRHs, PCIs, SSBs, or beam identifiers such that an MPE limitation (or a similar limitation) is not exceeded with regard to the target cell.

In a fourth operation 320, the UE 120 and the BS 110-1 may perform the uplink-only cell switch. For example, the UE 120 and the BS 110-1 may perform a physical-layer or MAC-layer inter-cell mobility operation with regard to an uplink of the UE 120 based at least in part on transmitting the request 310. In the physical-layer or MAC-layer mobility operation, the UE 120 and the BS 110-1 may maintain a downlink configuration for a downlink between the UE 120 and the BS 110-1, and may switch and reconfigure an uplink (e.g., a cell associated with the uplink) to the target cell. In this way, the UE 120 and the BS 110-1 may perform a cell switch for the uplink and not the downlink, which conserves computing and communication resources associated with finding a suitable target cell on the downlink, configuring the downlink cell switch, and performing the downlink cell switch. Furthermore, performing the uplink-only cell switch reduces communication interruption on the downlink.

In a fifth operation, the UE 120 may receive downlink communications 325 (such as a physical downlink control channel or a physical downlink shared channel) on a first beam from a BS 110-1. In a sixth operation, the UE 120 may transmit uplink communications 330 (such as a physical uplink control channel or a physical uplink shared channel) on a second beam to a BS 110-2. In some examples, the first beam and the second beam may be associated with a single base station (for example, the BS 110-1 and the BS 110-2 may be the same BS). In other examples, the first beam and the second beam may be associated with two or more different base stations (for example, the BS 110-2 may be different than the BS 110-1). In some examples, the first beam and the second beam may be associated with a same cell. In some other examples, the first beam and the second beam may be associated with different cells. The second beam may be different than the first beam (for example, may have a different spatial configuration, may be associated with a different beam direction). At the UE 120, the first beam may be a receive beam and the second beam may be a transmit beam.

In some aspects, the UE 120 may train the first beam separately from the second beam. For example, the BS 110-1 may train the first beam with the UE 120, and the BS 110-2 may train the second beam with the UE 120 using separate beam training operations (such as channel estimation, determination of channel state information, selection of spatial parameters, determination of path gain, determination of number of paths, and so on) for the first beam and the second beam. More particularly, the UE 120 and the BS 110-1 may maintain a first beam pair tracking, adjustment, and recovery loop, and the UE 120 and the BS 110-2 may maintain a second beam pair tracking, adjustment, and recovery loop. In this way, separate beam training for the first beam and the second beam is enabled, which improves compliance with MPE limitations by providing for the usage of a second beam that does not lead to unacceptable radiation toward a user of the UE 120 while using a first beam that provides improved (such as optimal) downlink performance or that is already established. Furthermore, by using a previously established first beam and performing the uplink-only cell switch, communication and processing resources that would otherwise be used to perform an uplink-and-downlink cell switch are conserved.

In some aspects, the uplink communications 330 may include, for example, an acknowledgment in a physical uplink control channel for downlink physical shared channel data, uplink data, or control information in a physical uplink shared channel. In some aspects, the downlink communications 335 may include, for example, a downlink shared channel, a downlink control channel, downlink reference signaling, or the like. In some aspects, the physical downlink shared channel and the physical uplink shared channel may be scrambled using different physical cell identifiers, such as physical cell identifiers associated with the first beam and the second beam, respectively. In some aspects, the physical downlink shared channel and the physical uplink shared channel may be scrambled using respective cell-specific scrambling sequences associated with the first beam and the second beam, respectively. By scrambling the physical downlink shared channel and the physical uplink shared channel differently, inter-cell interference between cells associated with the first beam and the second beam is eliminated or reduced.

The operations described herein, while primarily described in the context of uplink-only cell switches, can also be applied for signaling and performing downlink-only cell switches. For example, a UE may determine that a trigger condition associated with a cell switch is satisfied. The UE may transmit a request for a cell switch, which may or may not indicate that the cell switch is a downlink-only cell switch. ABS may determine that the cell switch is to be a downlink-only cell switch. The UE and the BS may perform the downlink-only cell switch.

Figure 4:
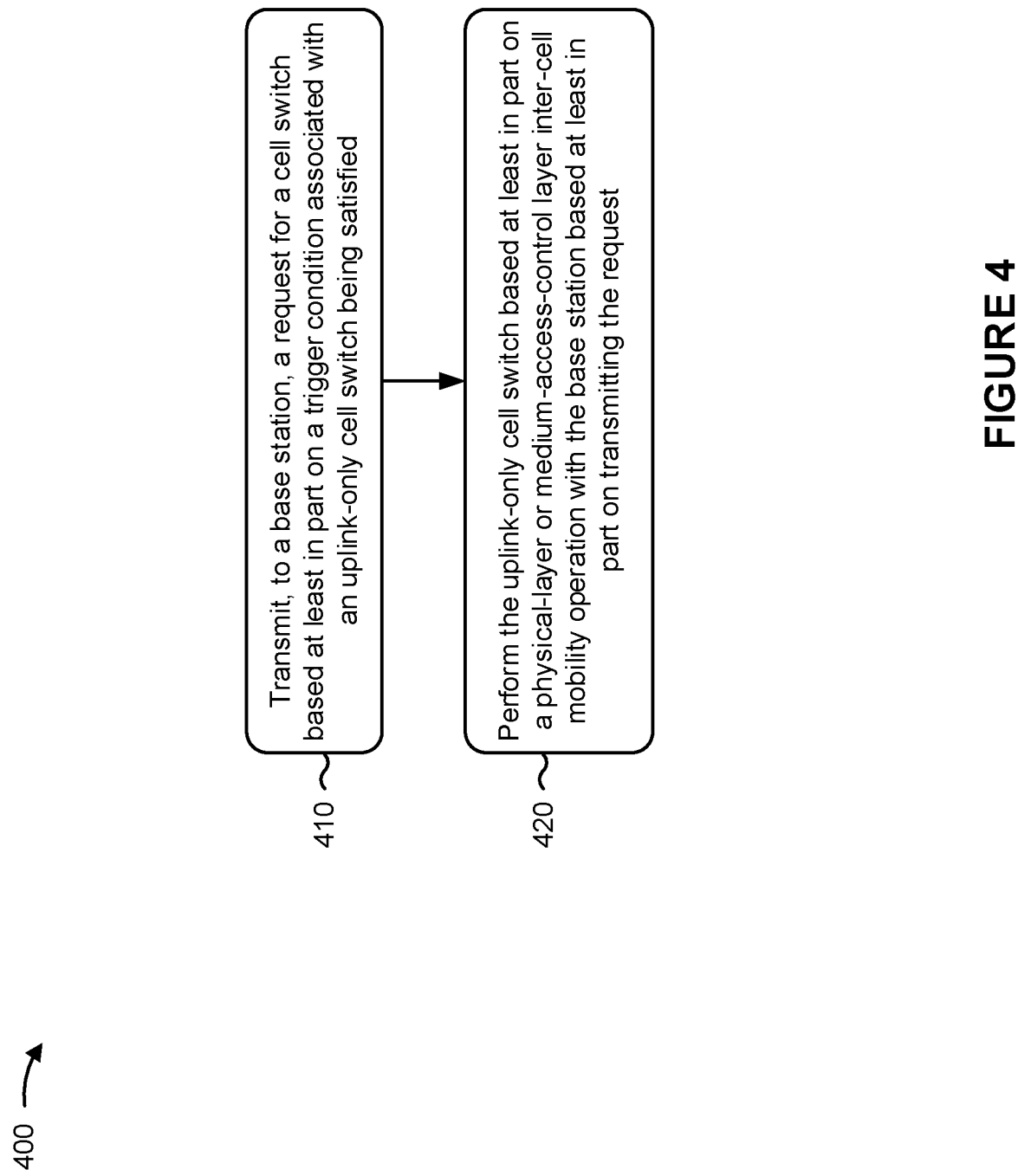
FIG. 4 is a flowchart illustrating an example process performed by a UE in accordance with the present disclosure.

FIG. 4 is a flowchart illustrating an example process 400 performed, for example, by a UE in accordance with the present disclosure. Example process 400 is an example where the UE (for example, UE 120, among other examples) performs operations associated with a Layer 1 based uplink-only cell switch.

As further shown in FIG. 4, in some aspects, process 400 may include transmitting, to a base station, a request for a cell switch based at least in part on a trigger condition associated with an uplink-only cell switch being satisfied (block 410). For example, the UE (such as by using controller/processor 280, transmit processor 264, TX MIMO processor 266, MOD 254, antenna 252, or other components) may transmit, to a base station, a request for a cell switch based at least in part on a trigger condition associated with an uplink-only cell switch being satisfied, as described above. In some aspects, the request for the cell switch may be a request for an uplink-only cell switch, and the base station may determine that the cell switch is to be an uplink-only cell switch based at least in part on the request. In some aspects, the request for the cell switch may not be a request for an uplink-only cell switch, and the base station may determine that the cell switch is to be an uplink-only cell switch as described elsewhere herein. In some aspects, the UE may determine that a trigger condition associated with a cell switch is satisfied. For example, the trigger condition may not be specific to an uplink-only cell switch, as described elsewhere herein. In some aspects, the trigger condition may be specific to an uplink-only cell switch, as also described elsewhere herein.

As further shown in FIG. 4, in some aspects, process 400 may include performing the uplink-only cell switch based at least in part on a physical-layer or medium-access-control layer inter-cell mobility operation with the base station based at least in part on transmitting the request (block 420). For example, the UE (such as by using controller/processor 280, transmit processor 264, TX MIMO processor 266, MOD 254, antenna 252, or other components) may perform the uplink-only cell switch based at least in part on a physical-layer or medium-access-control layer inter-cell mobility operation with the base station based at least in part on transmitting the request, as described above.

Process 400 may include additional aspects, such as any single aspect or any combination of aspects described below or in connection with one or more other processes described elsewhere herein.

In a first aspect, the trigger condition is based at least in part on a maximum permissible exposure condition on an uplink of the UE.

In a second additional aspect, alone or in combination with the first aspect, the request for the cell switch is a request for an uplink-only cell switch.

In a third additional aspect, alone or in combination with one or more of the first and second aspects, performing the uplink-only cell switch is based at least in part on information configuring the uplink-only cell switch.

In a fourth additional aspect, alone or in combination with one or more of the first through third aspects, process 400 includes receiving the information configuring the uplink-only cell switch using at least one of radio resource control signaling, a medium access control control element, or downlink control information.

In a fifth additional aspect, alone or in combination with one or more of the first through fourth aspects, the information configuring the uplink-only cell switch identifies at least one of: a remote radio head for a target uplink cell of the uplink-only cell switch, a physical cell identifier for the target uplink cell, or a synchronization signal block for the target uplink cell.

In a sixth additional aspect, alone or in combination with one or more of the first through fifth aspects, process 400 includes receiving downlink communications using a first beam, and transmitting uplink communications using a second beam, wherein the first beam is used for an uplink of the UE before the uplink-only cell switch and the second beam is used for the uplink of the UE after the uplink-only cell switch.

In a seventh additional aspect, alone or in combination with one or more of the first through sixth aspects, process 400 includes performing a first training operation for the first beam and a second training operation, different than the first training operation, for the second beam.

In an eighth additional aspect, alone or in combination with one or more of the first through seventh aspects, the uplink communications using the second beam include at least one of uplink data or an acknowledgment associated with downlink data.

In a ninth additional aspect, alone or in combination with one or more of the first through eighth aspects, process 400 includes scrambling the uplink communications using a first physical cell identifier, and receiving the downlink communications further includes descrambling the downlink communications using a second physical cell identifier that is different than the first physical cell identifier.

In a tenth additional aspect, alone or in combination with one or more of the first through ninth aspects, the first beam is associated with a first physical cell identifier and the second beam is associated with a second physical cell identifier.

In an eleventh additional aspect, alone or in combination with one or more of the first through tenth aspects, the uplink communications and the downlink communications are associated with a same cell that uses the first physical cell identifier and the second physical cell identifier or two different cells that use the first physical cell identifier and the second physical cell identifier, respectively.

Although FIG. 4 shows example blocks of process 400, in some aspects, process 400 may include additional blocks, fewer blocks, different blocks, or differently arranged blocks than those depicted in FIG. 4. Additionally or alternatively, two or more of the blocks of process 400 may be performed in parallel.

Figure 5:
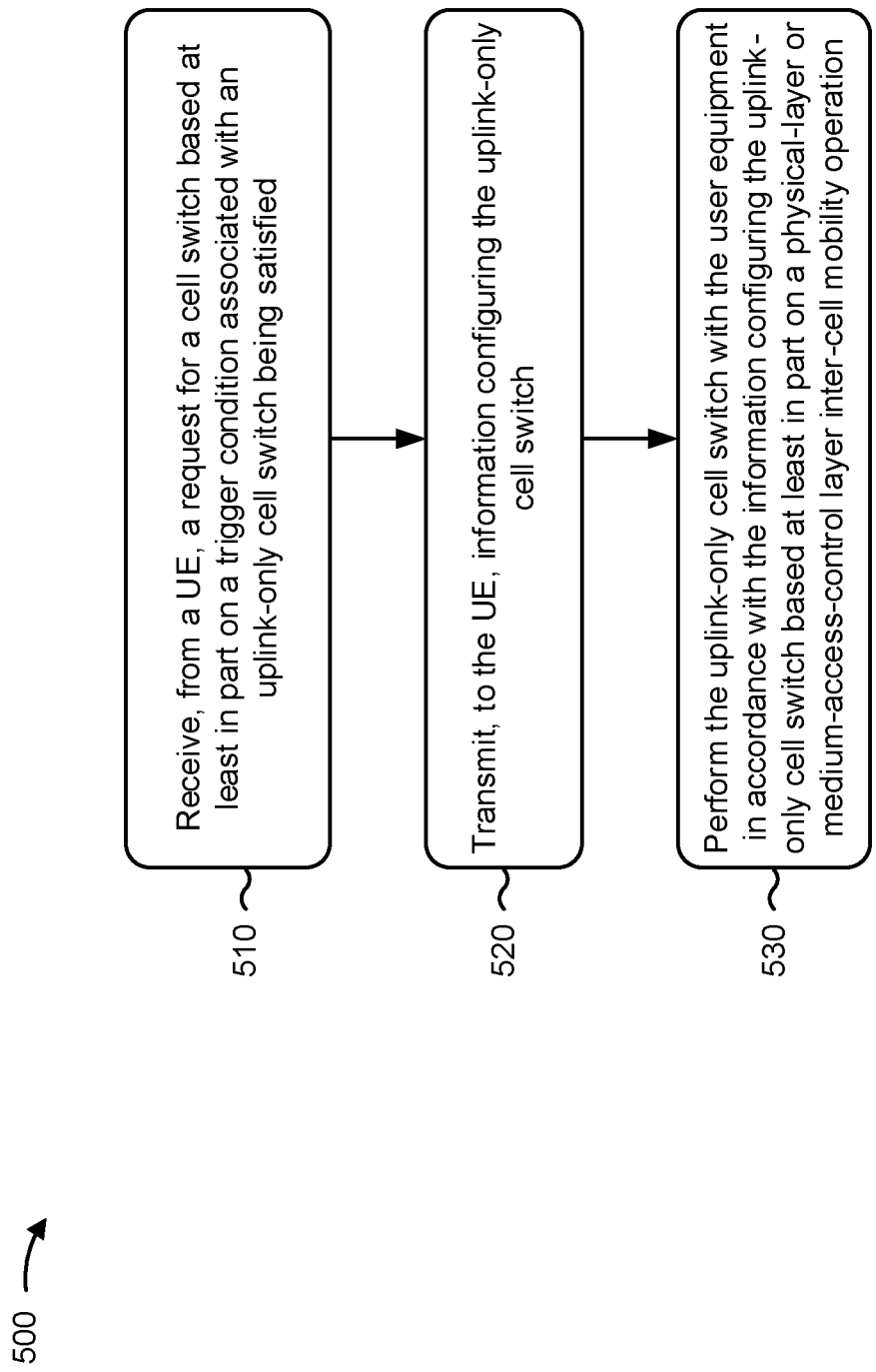
FIG. 5 is a flowchart illustrating an example process performed by a UE in accordance with the present disclosure.

FIG. 5 is a flowchart illustrating an example process 500 performed, for example, by a base station in accordance with the present disclosure. Example process 500 is an example where the base station (for example, base station 110, among other examples) performs operations associated with a Layer 1 based uplink-only cell switch.

As shown in FIG. 5, in some aspects, process 500 may include receiving, from a UE, a request for a cell switch based at least in part on a trigger condition associated with an uplink-only cell switch being satisfied (block 510). For example, the base station (such as by using antenna 234, DEMOD 232, MIMO detector 236, receive processor 238, controller/processor 240, or other components) may receive, from a UE, a request for a cell switch based at least in part on a trigger condition associated with an uplink-only cell switch being satisfied, as described above.

As further shown in FIG. 5, in some aspects, process 500 may include transmitting, to the UE, information configuring the uplink-only cell switch (block 520). For example, the base station (such as by using controller/processor 240, transmit processor 220, TX MIMO processor 230, MOD 232, antenna 234, or other components) may transmit, to the UE, information configuring the uplink-only cell switch, as described above.

As further shown in FIG. 5, in some aspects, process 500 may include performing the uplink-only cell switch with the user equipment in accordance with the information configuring the uplink-only cell switch and based at least in part on a physical-layer or medium-access-control layer inter-cell mobility operation (block 530). For example, the base station (such as by using controller/processor 240, transmit processor 220, TX MIMO processor 230, MOD 232, antenna 234, or other components) may perform the uplink-only cell switch with the user equipment in accordance with the information configuring the uplink-only cell switch based at least in part on a physical-layer or medium-access-control layer inter-cell mobility operation, as described above.

Process 500 may include additional aspects, such as any single aspect or any combination of aspects described below or in connection with one or more other processes described elsewhere herein.

In a first aspect, the trigger condition is based at least in part on a maximum permissible exposure condition on an uplink of the UE.

In a second additional aspect, alone or in combination with the first aspect, receiving the request for the cell switch includes receiving uplink control information that indicates the uplink-only cell switch is to be performed.

In a third additional aspect, alone or in combination with one or more of the first and second aspects, process 500 includes transmitting the information configuring the uplink-only cell switch using at least one of radio resource control signaling, a medium access control control element, or downlink control information.

In a fourth additional aspect, alone or in combination with one or more of the first through third aspects, the information configuring the uplink-only cell switch identifies at least one of: a remote radio head for a target uplink cell of the uplink-only cell switch, a physical cell identifier for the target uplink cell, or a synchronization signal block for the target uplink cell.

In a fifth additional aspect, alone or in combination with one or more of the first through fourth aspects, process 500 includes determining the information configuring the uplink-only cell switch based at least in part on a reference signal received power associated with a synchronization signal block corresponding to a physical cell identifier for a target uplink cell of the uplink-only cell switch.

In a sixth additional aspect, alone or in combination with one or more of the first through fifth aspects, process 500 includes transmitting downlink communications using a first beam, and receiving uplink communications using a second beam, wherein the first beam is used for an uplink of the UE before the uplink-only cell switch and the second beam is used for the uplink of the UE after the uplink-only cell switch.

In a seventh additional aspect, alone or in combination with one or more of the first through sixth aspects, process 500 includes performing a first training operation for the first beam and a second training operation, different than the first training operation, for the second beam.

In an eighth additional aspect, alone or in combination with one or more of the first through seventh aspects, the uplink communications using the second beam include at least one of uplink data or an acknowledgment associated with downlink data.

In a ninth additional aspect, alone or in combination with one or more of the first through eighth aspects, process 500 includes descrambling the uplink communications using a first physical cell identifier and scrambling the downlink communications using a second physical cell identifier that is different than the first physical cell identifier.

In a tenth additional aspect, alone or in combination with one or more of the first through ninth aspects, the uplink communications and the downlink communications are associated with a same cell that uses the first physical cell identifier and the second physical cell identifier.

In an eleventh additional aspect, alone or in combination with one or more of the first through tenth aspects, the first beam is associated with a first physical cell identifier and the second beam is associated with a second physical cell identifier.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
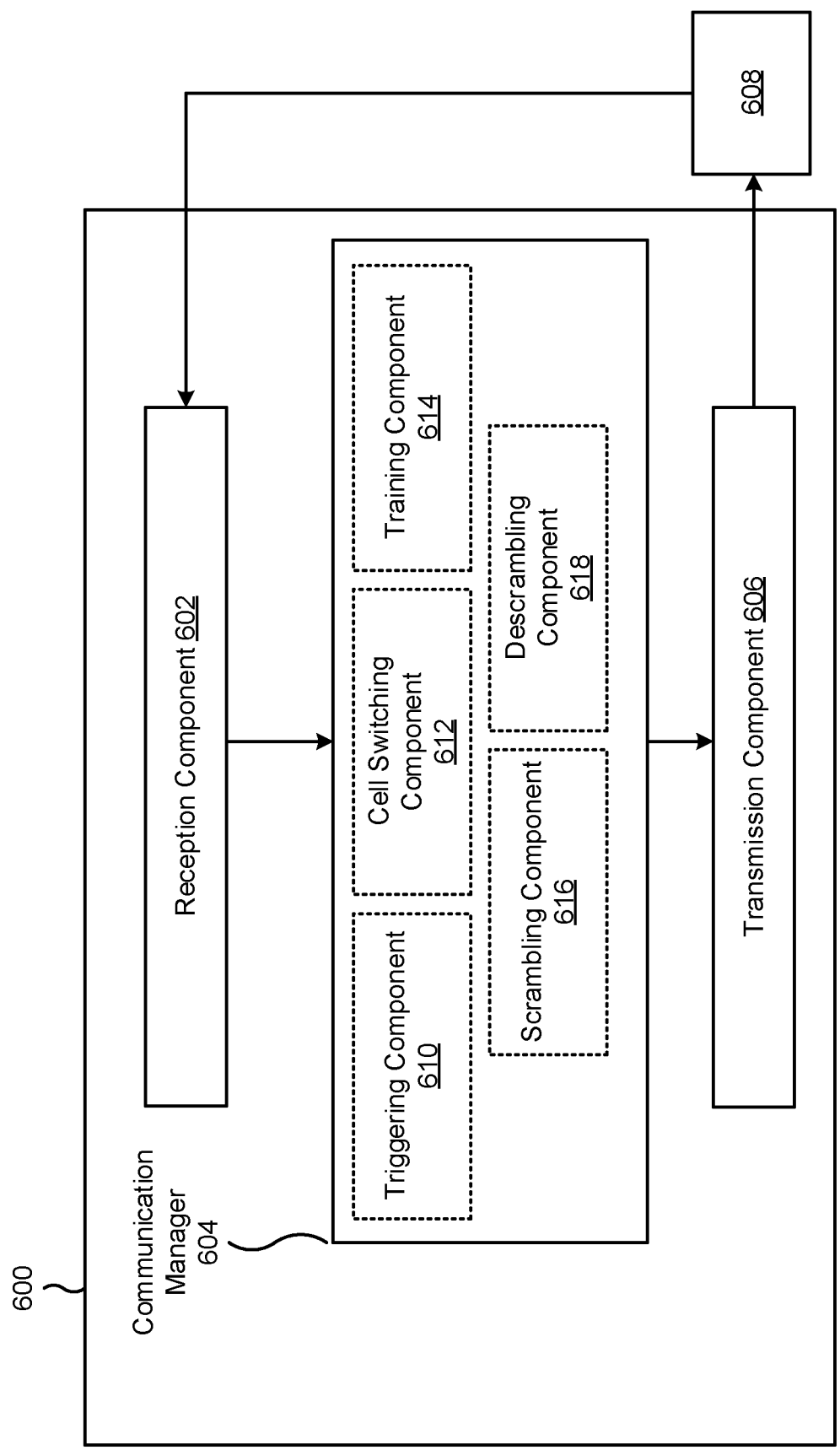
FIG. 6 is a block diagram of an example apparatus for wireless communication.

FIG. 6 is a block diagram of an example apparatus 600 for wireless communication. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIG. 3. Additionally or alternatively, the apparatus 600 may be configured to perform one or more processes described herein, such as process 400 of FIG. 4. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be collocated with the reception component 602 in a transceiver.

The communication manager 604 may transmit or cause transmission component 606 to transmit, to a base station, a request for a cell switch; determine that a trigger condition associated with an uplink-only cell switch is satisfied; and perform or cause transmission component 606 or reception component 602 to perform the uplink-only cell switch based at least in part on a physical-layer or medium-access-control layer inter-cell mobility operation with the base station based at least in part on transmitting the request. In some aspects, the communication manager 604 may include a controller/processor, a memory, or a combination thereof, of the UE described above in connection with FIG. 2.

In some aspects, the communication manager 604 may include a set of components, such as a triggering component 610, a cell switching component 612, a training component 614, a scrambling component 616, a descrambling component 618, or a combination thereof. Alternatively, the set of components may be separate and distinct from the communication manager 604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The triggering component 610 may determine that a trigger condition associated with an uplink-only cell switch is satisfied. The cell switching component 612 may perform the uplink-only cell switch based at least in part on a physical-layer or medium-access-control layer inter-cell mobility operation with the base station based at least in part on transmitting the request. The training component 614 may perform a first training operation for the first beam and a second training operation, different than the first training operation, for the second beam. The scrambling component 616 may scramble the uplink communications using a first physical cell identifier. The descrambling component 618 may descramble the downlink communications using a second physical cell identifier that is different than the first physical cell identifier.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
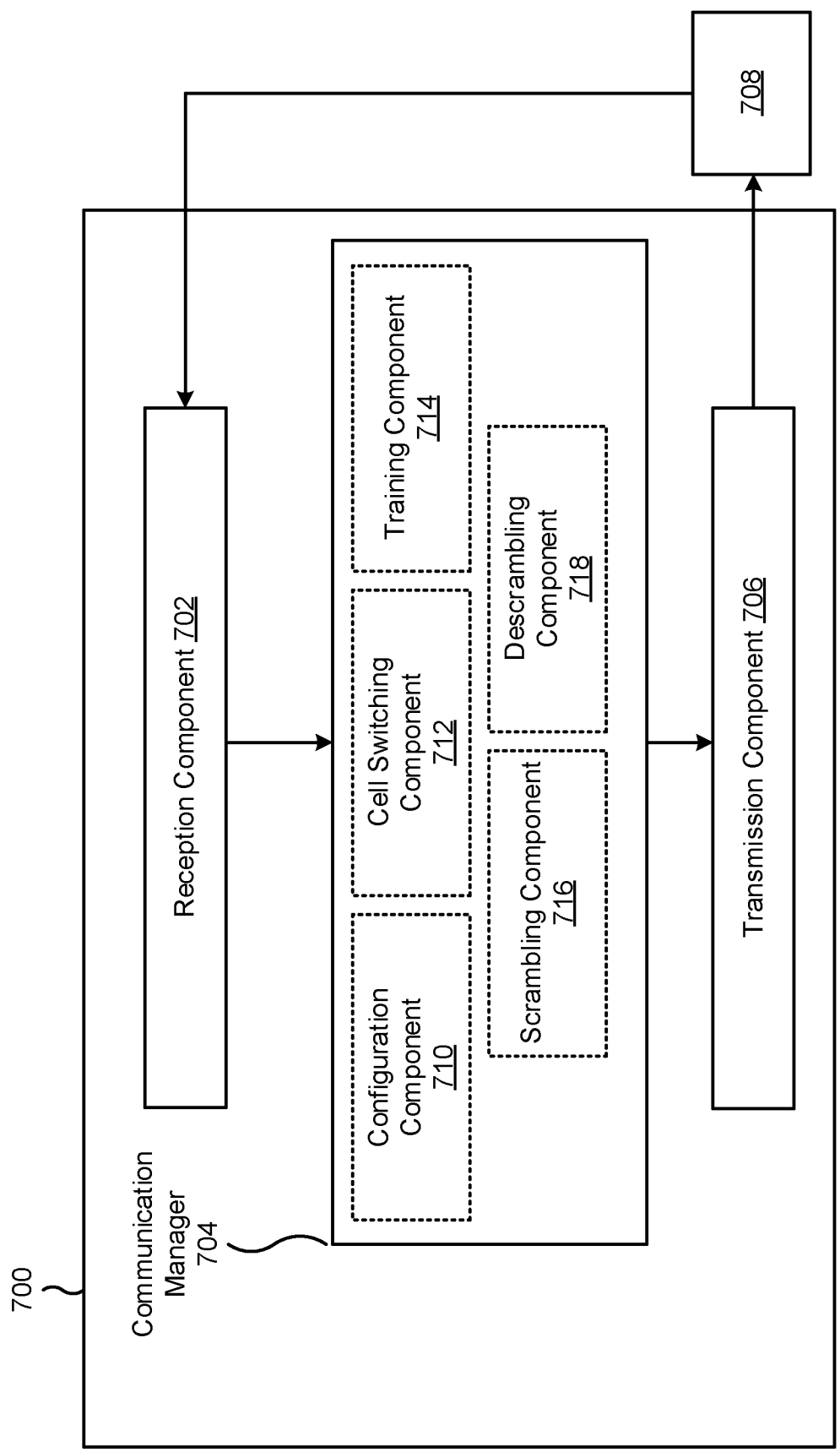
FIG. 7 is a block diagram of an example apparatus for wireless communication.

FIG. 7 is a block diagram of an example apparatus 700 for wireless communication. The apparatus 700 may be a base station, or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 may include one or more components of the base station described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the base station described above in connection with FIG. 2. In some aspects, the transmission component 706 may be collocated with the reception component 702 in a transceiver.

The communication manager 704 may receive or cause the reception component 702 to receive, from a user equipment (UE), a request for a cell switch based at least in part on a determination by the UE that a trigger condition associated with an uplink-only cell switch is satisfied; transmit or cause the transmission component 706 to transmit, to the UE, information configuring the uplink-only cell switch; and perform or cause the reception component 702 or the transmission component 706 to perform the uplink-only cell switch with the user equipment in accordance with the information configuring the uplink-only cell switch based at least in part on a physical-layer or medium-access-control layer inter-cell mobility operation. In some aspects, the communication manager 704 may include a controller/processor, a memory, a scheduler, a communication unit, or a combination thereof, of the base station described above in connection with FIG. 2.

In some aspects, the communication manager 704 may include a set of components, such as a configuration component 710, a cell switching component 712, a training component 714, a scrambling component 716, a descrambling component 718, or a combination thereof. Alternatively, the set of components may be separate and distinct from the communication manager 704. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 710 may determine information configuring the uplink-only cell switch based at least in part on a reference signal received power associated with a synchronization signal block corresponding to a physical cell identifier for a target uplink cell of the uplink-only cell switch; and transmit or cause the transmission component 706 to transmit information configuring the uplink-only cell switch. The cell switching component 712 may perform the uplink-only cell switch with the user equipment in accordance with the information configuring the uplink-only cell switch based at least in part on a physical-layer or medium-access-control layer inter-cell mobility operation. In some aspects, the cell switching component 712 may receive or cause the reception component 702 to receive a request for a cell switch based at least in part on a determination by the UE that a trigger condition associated with an uplink-only cell switch is satisfied. The training component 714 may perform a first training operation for the first beam and a second training operation, different than the first training operation, for the second beam. The scrambling component 716 may scramble the downlink communications using a second physical cell identifier that is different than the first physical cell identifier. The descrambling component 718 may descramble the uplink communications using a first physical cell identifier.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting, to a base station, a request for a cell switch based at least in part on a trigger condition associated with an uplink-only cell switch being satisfied; and performing the uplink-only cell switch based at least in part on a physical-layer or medium-access-control layer inter-cell mobility operation.

Aspect 2: The method of Aspect 1, wherein the trigger condition is based at least in part on a maximum permissible exposure condition on an uplink of the UE.

Aspect 3: The method of any of Aspects 1-2, wherein the request for the cell switch is a request for an uplink-only cell switch.

Aspect 4: The method of any of Aspects 1-3, wherein performing the uplink-only cell switch is based at least in part on information configuring the uplink-only cell switch, and wherein the method further comprises receiving the information configuring the uplink-only cell switch using at least one of: radio resource control signaling, a medium access control control element, or downlink control information.

Aspect 5: The method of Aspect 4, wherein the information configuring the uplink-only cell switch identifies at least one of: a remote radio head for a target uplink cell of the uplink-only cell switch, a physical cell identifier for the target uplink cell, or a synchronization signal block for the target uplink cell.

Aspect 6: The method of any of Aspects 1-5, further comprising: receiving downlink communications using a first beam; and transmitting uplink communications using a second beam, wherein the first beam is used for an uplink of the UE before the uplink-only cell switch and the second beam is used for the uplink of the UE after the uplink-only cell switch.

Aspect 7: The method of Aspect 6, further comprising: performing a first training operation for the first beam and a second training operation, different than the first training operation, for the second beam.

Aspect 8: The method of Aspect 6, wherein the uplink communications using the second beam include at least one of uplink data or an acknowledgment associated with downlink data.

Aspect 9: The method of Aspect 6, further comprising scrambling the uplink communications using a first physical cell identifier; and wherein receiving the downlink communications further comprises descrambling the downlink communications using a second physical cell identifier that is different than the first physical cell identifier.

Aspect 10: The method of Aspect 6, wherein the uplink communications and the downlink communications are associated with one of: a same cell that uses a first physical cell identifier and a second physical cell identifier, or two different cells that use the first physical cell identifier and the second physical cell identifier, respectively.

Aspect 11: A method of wireless communication performed by a base station, comprising: receiving, from a user equipment (UE), a request for a cell switch based at least in part on a trigger condition associated with an uplink-only cell switch; transmitting, to the UE, information configuring the uplink-only cell switch; and performing the uplink-only cell switch with the user equipment in accordance with the information configuring the uplink-only cell switch and based at least in part on a physical-layer or medium-access-control layer inter-cell mobility operation.

Aspect 12: The method of Aspect 11, further comprising configuring the UE with information indicating the trigger condition Aspect 13: The method of any of Aspects 11-12, wherein the trigger condition is based at least in part on a maximum permissible exposure condition on an uplink of the UE.

Aspect 14: The method of any of Aspects 11-13, wherein receiving the request for the cell switch includes receiving uplink control information that indicates the uplink-only cell switch is to be performed.

Aspect 15: The method of any of Aspects 11-14, further comprising transmitting the information configuring the uplink-only cell switch using at least one of: radio resource control signaling, a medium access control control element, or downlink control information, wherein the information configuring the uplink-only cell switch identifies at least one of: a remote radio head for a target uplink cell of the uplink-only cell switch, a physical cell identifier for the target uplink cell, or a synchronization signal block for the target uplink cell.

Aspect 16: The method of any of Aspects 11-15, further comprising: determining the information configuring the uplink-only cell switch based at least in part on a reference signal received power associated with a synchronization signal block corresponding to a physical cell identifier for a target uplink cell of the uplink-only cell switch.

Aspect 17: The method of any of Aspects 11-16, further comprising: transmitting downlink communications using a first beam; and receiving uplink communications using a second beam, wherein the first beam is used for an uplink of the UE before the uplink-only cell switch and the second beam is used for the uplink of the UE after the uplink-only cell switch.

Aspect 18: The method of Aspect 17, further comprising: performing a first training operation for the first beam and a second training operation, different than the first training operation, for the second beam.

Aspect 20: The method of Aspect 17, wherein the uplink communications using the second beam include at least one of uplink data or an acknowledgment associated with downlink data.

Aspect 21: The method of Aspect 17, further comprising descrambling the uplink communications using a first physical cell identifier; and scrambling the downlink communications using a second physical cell identifier that is different than the first physical cell identifier.

Aspect 22: The method of Aspect 21, wherein the uplink communications and the downlink communications are associated with a same cell that uses the first physical cell identifier and the second physical cell identifier.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, to a base station, a request for a cell switch responsive at least in part to a trigger condition associated with an uplink-only cell switch being satisfied;
    performing the uplink-only cell switch in accordance at least in part with a physical-layer operation or a medium-access-control layer inter-cell mobility operation;
    receiving, responsive to performing the uplink-only cell switch, downlink communications using a first beam; and
    transmitting, responsive to performing the uplink-only cell switch, uplink communications using a second beam, the first beam being used for an uplink of the UE before the uplink-only cell switch and the second beam being used for the uplink of the UE after the uplink-only cell switch.

2. The method of claim 1, wherein the request for the cell switch is a request for the uplink-only cell switch.

3. The method of claim 1, wherein performing the uplink-only cell switch is in accordance at least in part with information configuring the uplink-only cell switch, the method further comprising receiving the information configuring the uplink-only cell switch using at least one of:
    radio resource control signaling,
    a medium access control control element, or
    downlink control information.

4. The method of claim 3, wherein the information configuring the uplink-only cell switch identifies at least one of:
    a remote radio head for a target uplink cell of the uplink-only cell switch,
    a physical cell identifier for the target uplink cell, or
    a synchronization signal block for the target uplink cell.

5. The method of claim 1, further comprising:
    performing a first training operation for the first beam and a second training operation, different than the first training operation, for the second beam.

6. The method of claim 1, wherein the uplink communications using the second beam include at least one of uplink data or an acknowledgment associated with downlink data.

7. The method of claim 1, further comprising scrambling the uplink communications using a first physical cell identifier; and
    wherein receiving the downlink communications further comprises descrambling the downlink communications using a second physical cell identifier that is different than the first physical cell identifier.

8. The method of claim 1, wherein the uplink communications and the downlink communications are associated with one of:
    a same cell that uses a first physical cell identifier and a second physical cell identifier, or
    two different cells that use the first physical cell identifier and the second physical cell identifier, respectively.

9. The method of claim 1, wherein performing the uplink-only cell switch in accordance at least in part with the physical-layer operation or the medium-access-control layer inter-cell mobility operation comprises:
    performing the uplink-only cell switch in accordance at least in part with the physical- layer operation using physical layer signaling or the medium-access-control layer inter-cell mobility operation using medium-access-control layer signaling.

10. A method of wireless communication performed by a base station, comprising:
    receiving, from a user equipment (UE), a request for a cell switch responsive at least in part to a trigger condition associated with an uplink-only cell switch being satisfied;
    transmitting, to the UE, information configuring the uplink-only cell switch;
    performing the uplink-only cell switch with the UE in accordance with the information configuring the uplink-only cell switch and in accordance with a physical-layer operation or a medium-access-control layer inter-cell mobility operation;
    transmitting, responsive to performing the uplink-only cell switch, downlink communications using a first beam; and
    receiving, responsive to performing the uplink-only cell switch, uplink communications using a second beam, the first beam being used for an uplink of the UE before the uplink-only cell switch and the second beam being used for the uplink of the UE after the uplink-only cell switch.

11. The method of claim 10, further comprising configuring the UE with information indicating the trigger condition.

12. The method of claim 10, wherein receiving the request for the cell switch includes receiving uplink control information that indicates the uplink-only cell switch is to be performed.

13. The method of claim 10, further comprising transmitting the information configuring the uplink-only cell switch using at least one of:
    radio resource control signaling,
    a medium access control control element, or
    downlink control information, the information configuring the uplink-only cell switch identifying at least one of:
        a remote radio head for a target uplink cell of the uplink-only cell switch,
        a physical cell identifier for the target uplink cell, or
        a synchronization signal block for the target uplink cell.

14. The method of claim 10, further comprising:
    determining the information configuring the uplink-only cell switch in accordance at least in part with a reference signal received power associated with a synchronization signal block corresponding to a physical cell identifier for a target uplink cell of the uplink-only cell switch.

15. The method of claim 10, further comprising:
    performing a first training operation for the first beam and a second training operation, different than the first training operation, for the second beam.

16. The method of claim 10, wherein the uplink communications using the second beam include at least one of uplink data or an acknowledgment associated with downlink data.

17. The method of claim 10, further comprising descrambling the uplink communications using a first physical cell identifier; and
    scrambling the downlink communications using a second physical cell identifier that is different than the first physical cell identifier.

18. The method of claim 10, wherein the uplink communications and the downlink communications are associated with one of:
    a same cell that uses a first physical cell identifier and a second physical cell identifier, or
    two different cells that use the first physical cell identifier and the second physical cell identifier, respectively.

19. The method of claim 10, wherein performing the uplink-only cell switch with the UE in accordance with the information configuring the uplink-only cell switch and in accordance with the physical-layer operation or the medium-access-control layer inter-cell mobility operation comprises:
    performing the uplink-only cell switch in accordance with the information configuring the uplink-only cell switch and in accordance with the physical-layer operation using physical layer signaling or the medium-access-control layer inter-cell mobility operation using medium-access-control layer signaling.

20. A user equipment (UE) for wireless communication, comprising:
    a memory; and
    one or more processors operatively coupled with the memory, the one or more processors configured to:
        transmit, to a base station, a request for a cell switch responsive at least in part to a trigger condition associated with an uplink-only cell switch being satisfied;
        perform the uplink-only cell switch in accordance at least in part with a physical-layer operation or a medium-access-control layer inter-cell mobility operation with the base station;
        receive, responsive to the uplink-only cell switch, downlink communications using a first beam; and
        transmit, responsive to the uplink-only cell switch, uplink communications using a second beam, the first beam being used for an uplink of the UE before the uplink-only cell switch and the second beam being used for the uplink of the UE after the uplink-only cell switch.

21. The UE of claim 20, wherein the request for the cell switch is a request for the uplink-only cell switch.

22. The UE of claim 20, wherein the one or more processors are further configured to:
    perform a first training operation for the first beam and a second training operation, different than the first training operation, for the second beam.

23. The UE of claim 20, wherein the uplink communications using the second beam include at least one of uplink data or an acknowledgment associated with downlink data.

24. The UE of claim 20, wherein the one or more processors are further configured to:
    scramble the uplink communications using a first physical cell identifier; and
    descramble the downlink communications using a second physical cell identifier that is different than the first physical cell identifier to receive the downlink communications.

25. The UE of claim 20, wherein the uplink communications and the downlink communications are associated with one of:
    a same cell that uses a first physical cell identifier and a second physical cell identifier, or two different cells that use the first physical cell identifier and the second physical cell identifier, respectively.

26. The UE of claim 20, wherein the one or more processors, to perform the uplink-only cell switch in accordance at least in part with the physical-layer operation or the medium-access-control layer inter-cell mobility operation, are configured to:
perform the uplink-only cell switch in accordance at least in part with the physical-layer operation using physical layer signaling or the medium-access-control layer inter-cell mobility operation using medium-access-control layer signaling.

27. A base station for wireless communication, comprising:
a memory; and
one or more processors operatively coupled to the memory, the one or more processors configured to:
receive, from a user equipment (UE), a request for a cell switch responsive at least in part to a trigger condition associated with an uplink-only cell switch being satisfied;
transmit, to the UE, information configuring the uplink-only cell switch;
perform the uplink-only cell switch with the UE in accordance with the information configuring the uplink-only cell switch and in accordance with a physical-layer operor medium-access-control layer inter-cell mobility operation.

28. The base station of claim 27, wherein the one or more processors are further configured to configure the UE with information indicating the trigger condition.

29. The base station of claim 27, wherein the one or more processors, to receive the request for the cell switch, are configured to receive uplink control information that indicates the uplink-only cell switch is to be performed.

30. The base station of claim 27, wherein the one or more processors, to perform the uplink-only cell switch with the UE in accordance with the information configuring the uplink-only cell switch and in accordance with the physical-layer operation or the medium-access-control layer inter-cell mobility operation, are configured to:
perform the uplink-only cell switch in accordance with the information configuring the uplink-only cell switch and in accordance with the physical-layer operation using physical layer signaling or the medium-access-control layer inter-cell mobility operation using medium-access-control layer signaling.

* * * * *